Dec. 19, 1950 D. L. MILLER 2,535,017
STARTER GEARING FOR INTERNAL-COMBUSTION ENGINES
Filed April 25, 1949

INVENTOR.
Donald L. Miller
BY
Clinton S. James
ATTORNEY

WITNESS:
Esther M. Stockton

Patented Dec. 19, 1950

2,535,017

UNITED STATES PATENT OFFICE 2,535,017

STARTER GEARING FOR INTERNAL-COMBUSION ENGINES

Donald L. Miller, Elmira, N. Y., assignor to Bendix Aviation Corporation, a corporation of Delaware Application April 25, 1949, Serial No. 89,488

5 Claims. (Cl. 74—6)

The present invention relates to starter gearing for internal combustion engines, and more particularly to a heavy duty manual shift of the type disclosed in applicant's copending Patent No. 2,500,132, issued March 7, 1950.

In shifts of the type incorporating a dental form of over-running clutch which disconnects the starting motor from the drive pinion when the engine becomes self operative, it is necessary to provide some reliable form of control for reestablishing the driving connection if the engine does not continue to run under its own power. In the above cited application this is accomplished by friction and camming means which serve to reclose the dental clutch when the speed of the starting motor exceeds that of the pinion.

While devices of this character have been found to provide satisfactory control of the clutch during normal use of the shift, there is an appreciable generation of heat by the frictional connection during long periods of overrun at high speed, and it has been found desirable to reduce or eliminate this heating effect during high speed overrun without impairing the controlling action of the device, in order to cope satisfactorily with all conditions likely to be encountered in use of the shift by the public.

It is an object of the present invention to provide a novel starter shift incorporating an over-running clutch and an overload release, which is efficient and reliable in operation, and simple and economical in construction.

It is another object to provide such a device in which the overrunning clutch is of the dental type, and novel and effective means are provided for securing free over-running of the clutch without undue generation of heat, and for promptly reestablishing the driving connection when the engine ceases to overrun the starting motor.

It is another object to provide such a device incorporating a frictional connection between the overrunning clutch members which is relieved when the engine overruns the starting motor above a predetermined speed.

Further objects and advantages will be apparent from the following description taken in connection with the accompanying drawing in which.

Figure 1:
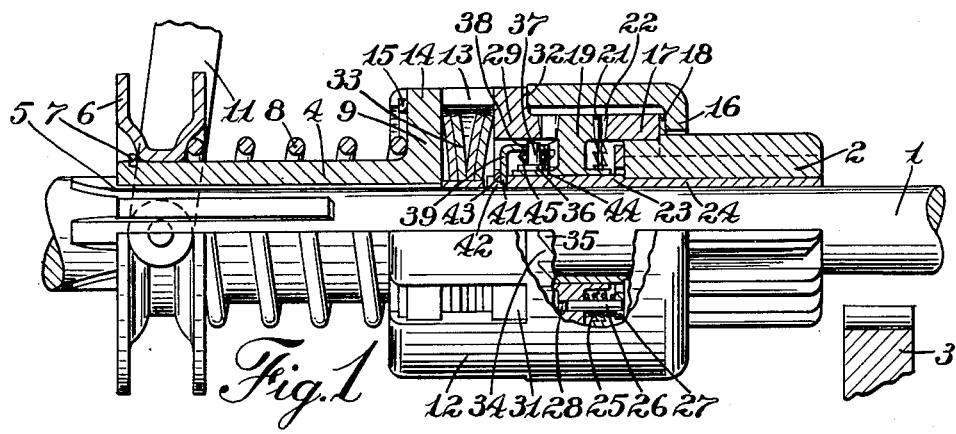
Fig. 1 is a side elevation, partly broken away and in section, showing a preferred embodiment of the invention with the parts in normal or idle position.

In Fig. 1 of the drawing there is illustrated the power shaft 1 which may be the extended armature shaft of a starting motor not illustrated, on which is freely journalled a pinion 2 for longitudinal movement into and out of mesh with a gear 3 of the engine to be started. Means for actuating the pinion is provided comprising a sleeve 4 splined on the power shaft as indicated at 5 and having a shift collar 6 slidably mounted thereon and normally pressed against a thrust ring 7 by a mesh-enforcing spring 8 which bears at its other end against a flange 9 formed on said sleeve. A shift fork 11 is arranged to engage in the shift collar 6 and when actuated either manually or by means of a shifting solenoid the fork is arranged to move the collar 6 and sleeve 4 along the shaft 1 toward the engine gear 3.

A barrel member 12 is provided adjacent one end with slots 13 adapted to slidably receive lugs 14 formed on the periphery of the flange 9 which thus supports and drives the barrel from the power shaft, said lugs 14 being retained in the slots 13 by a lock ring 15. The other end of the barrel 12 is provided with an inturned flange 16 forming a thrust bearing for a driven overrunning clutch member 17 contained in the barrel and rigidly fixed in any suitable manner on a reduced end portion of the pinion 2, a thrust ring 18 being preferably interposed between said clutch member and the flange 16.

A driving overrunning clutch member 19 having teeth 21 adapted to engage and drive the teeth 22 of the driven clutch member 17, is slidably journalled on the extended portion 23 of a bushing 24 pressed into the pinion 2 and bearing on the power shaft 1. Means including compression springs 25 are provided for normally holding the clutch members 17, 19 with their teeth 21, 22 out of engagement. Springs 25 are preferably maintained in position between said clutch members by means of pins 26 anchored at one end in a ring 27 bearing against the end of the pinion and the driven overrunning clutch member 17 and slidably mounted at their other ends in axially extending openings 28 in the driving overrunning clutch member 19.

An overload slip coupling means is provided for establishing the driving connection between the power shaft 1 and the pinion 2. This coupling comprises an annular driving coupling member 29 having radial lugs 31 extending into the slots 13 of the barrel, and held firmly against the shoulders 32 formed at the inner ends of said slots by the spring washers 33 located between the driving coupling member 29 and the flange 9 of sleeve 4. The driving coupling member 29 is provided with cam teeth 34 (Fig. 2) arranged to cooperate with similar cam teeth 35 on the driving overrunning clutch member 19, said teeth being so arranged that their inclined surfaces are in contact during the cranking operation, and the cranking torque is transmitted by said inclined surfaces to thereby form a coupling which may slip on overload by overcoming the pressure of the spring washers 33.

The inclined teeth 34, 35 of the overload slip coupling serve as cams to move the driving overrunning clutch member 19 into engagement with the driven clutch member 17 so as to cause engagement of their teeth 21, 22 when torque is being transferred through said coupling. In order to insure such traversal of the driving overrunning clutch member 19, a frictional connection is provided between said clutch member 19 and the pinion 2. As here illustrated, this frictional connection comprises a plurality of shoes 36 having stems 37 slidable radially in openings 38 in a collar member 39 which is fixedly mounted on the end of the extension 23 of the pinion bushing 24 as by means of tongues 41 extending into slots 42 in the end of said bushing and retained therein by a locking ring 43. The shoes 36 are normally held in frictional engagement with the extended hub 44 of the driving overrunning clutch member 19 by means of spring washers 45.

Figure 2:
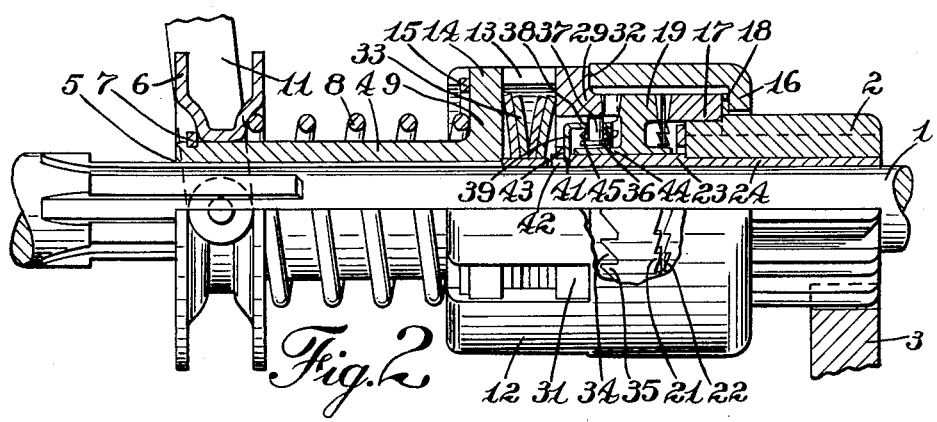
Fig. 2 is a similar view showing the parts in the positions assumed during overrunning of the pinion while in mesh with the rotating engine gear.

In operation, starting with the parts in the positions illustrated in Fig. 1, movement of the shifting fork 11 to the right either manually or electromagnetically, causes the entire assembly to move along the power shaft 1 until the pinion 2 meshes with the engine gear 3 as shown in Fig. 2. Energization of the starting motor thereupon rotates the power shaft 1, which rotation is transmitted through the splined connection 5 to the sleeve 4 and through the lugs 14 to the barrel 12, thereby rotating the driving coupling member 29 by means of the lugs 31. The driving overrunning clutch member 19 is frictionally held from rotation by the shoes 36 which are non-rotatably connected by the collar 39 to the pinion 2, the rotation of which is resisted by its engagement with the engine gear 3. The consequent camming action of the teeth 34, 35 of the coupling member 29 and the driving overrunning clutch member 19 causes the latter to be moved longitudinally to the right until the teeth 21, 22 of the overrunning clutch members are fully engaged. Since the longitudinal movement of the clutch member 19 is thereby arrested due to the thrust connection through the thrust washer 18 with the flange 16 of the barrel 12, further camming movement of the teeth 34, 35 can only take place by backward movement of the coupling member 29 against the pressure of the springs 33. Torque is, therefore, transmitted through the coupling and clutch members to the pinion to rotate the engine gear; shock loads which exceed a predetermined maximum causing the teeth 34, 35 to slip by each other momentarily.

When the engine starts, the rapid acceleration of the engine gear 3 rotates the pinion 2 at high speed, whereby the teeth 21, 22 of the overrunning clutch are cammed out of engagement. The rotation of the pinion 2 is transmitted through the collar 39 to the friction shoes 36. When this speed of rotation exceeds a predetermined maximum, centrifugal force causes the shoes 36 to move radially outward against the action of the springs 45, thus permitting the pinion 2 to rotate freely without frictional drag and generation of heat by said shoes.

If the engine should not remain self-operative, the reduction in the speed of rotation of the pinion 2, collar 39, and shoes 36 permits the springs 45 to move said shoes inwardly into frictional engagement with the driving overrunning clutch member 19, so that as soon as the speed of rotation of the starting motor exceeds that of pinion 2, the overrunning clutch members will be cammed together again by the coupling teeth 34, 35 and cranking will be resumed. When the engine is successfully started, the shift is moved back to its position by the fork 11.

Figure 3:
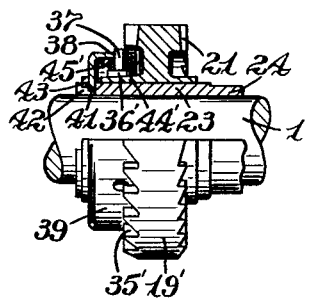
Fig. 3 is a detail of the driving overrunning clutch member with its retarding means so formed that the pressure of the frictional means assists in the longitudinal movement of the clutch member.
Figure 4:
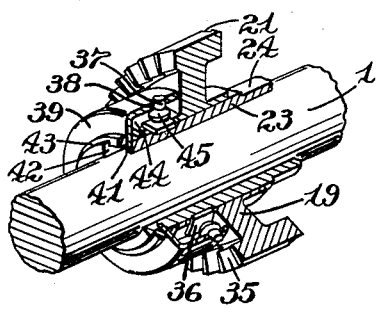
Fig. 4 is a detail in perspective of the driving overrunning clutch member partly broken away and in section to better illustrate the retarding means therefor.

In Fig. 3 of the drawing there is illustrated a modification in which hub 44' of the driving overrunning clutch member 19' is formed with an inclined or tapered surface, and the frictional shoes 36' are arranged to conform thereto. By this means the inward pressure on the shoes 36' by the springs 45' assists in insuring traversal of the clutch member 19' when torque is transmitted through its cam teeth 35'. In other respects, this embodiment operates similarly to that first described.

Although certain structures have been shown and described in detail, it will be noted that other embodiments are possible and that various changes may be made in the design and arrangement of the parts without departing from the spirit of the invention.

I claim:

1. In an engine starter transmission, a power shaft, a pinion having an axially extending bushing slidably journalled on the power shaft for longitudinal movement into and out of mesh with a gear of an engine to be started, a driven dental overrunning clutch member fixed to the pinion, a cooperating driving dental overrunning clutch member slidably journalled on the pinion bushing for longitudinal movement into and out of driving engagement with the driven overrunning clutch member, yielding means normally holding the overrunning clutch members out of driving engagement, means including a cam member connected to rotate with the power shaft, for moving the driving overrunning clutch member into operative engagement with the driven clutch member and for thereafter rotating the driven clutch member; a friction coupling between the driving overrunning clutch member and the pinion bushing, and means for releasing said friction coupling responsive to rotation of the pinion above a predetermined speed.

2. An engine starter transmission as set forth in claim 1 in which said frictional coupling comprises a shoe member mounted for rotation with the pinion bushing with freedom for limited radial movement into and out of frictional connection with the driving overrunning clutch member, and spring means urging said shoe radially inward into such frictional connection.

3. An engine starter transmission as set forth in claim 2 including further means for limiting the radial outward movement of said shoe.

4. In an engine starter, a power shaft, a pinion having an axially extending bushing slidably and rotatably mounted on the power shaft, a driven dental overrunning clutch member fixedly mounted on the pinion, a driving dental overrunning clutch member slidably mounted on the pinion bushing and longitudinally movable into and out of engagement with the driven overrunning clutch member, a cam member having a splined connection with the power shaft, said cam member and driving overrunning clutch member having engaging projections so formed that the transmission of torque from the cam member to the driving overrunning clutch member cams the latter into clutching engagement with the driven overrunning clutch member and thereafter rotates said clutch members in unison; yielding means normally holding the overrunning clutch members disengaged, means including a friction shoe, means connecting said shoe to rotate with the pinion bushing and bearing frictionally on the driving overrunning clutch member to form a frictional connection therebetween, and means for disengaging said shoe when the pinion rotates above a predetermined speed.

5. Engine starter gearing as set forth in claim 4 in which the driving overrunning clutch member is formed with a tapered portion for engagement with the friction shoe and including further, spring means urging said shoe radially into engagement with the tapered portion of the driving overrunning clutch member to simultaneously connect it frictionally to rotate with the pinion and to urge it longitudinally into engagement with the driven overrunning clutch member.

DONALD L. MILLER.

REFERENCES CITED

The following references are of record in the file of this patent:

UNITED STATES PATENTS

| Number | Name | Date |
|---|---|---|
| 1,892,056 | Jackson et al. | Dec. 27, 1932 |